United States Patent Office 3,770,863
Patented Nov. 6, 1973

3,770,863
METHOD FOR FORMING COMPOSITE
BUILDING ELEMENTS
Reinhold Magnus Elgenstierna, Stockholm, Sweden, assignor to Tegelindustriens Centralkantor AB, Stockholm, Sweden
Filed Aug. 17, 1971, Ser. No. 172,405
Claims priority, application Sweden, Aug. 20, 1970, 11,385/70
Int. Cl. B32b 31/06
U.S. Cl. 264—261    5 Claims

ABSTRACT OF THE DISCLOSURE

A method and carrier members for the formation of building elements of the type having a plurality of bricks, tiles or stones joined together by a binder. A plurality of carrier members, having slightly elastic side edges partially surrounding the side edges of bricks inserted into said carrier members, are positioned in a mold in their ultimate relationship as in the completed building element. Thereafter a bonding material is filled into the spaces defined between said carrier members to form the completed building element. In this way said carrier members may be filled before their arrangement in the mold and are thus also usable as a transporting package.

CROSS REFERENCE TO RELATED APPLICATIONS

In my prior copending application Ser. No. 855,345 filed Sept. 4, 1969 (now Pat. No. 3,629,384 issued Dec. 21, 1971), I disclosed a method for forming composite building elements.

The present invention relates to a method and carrier member for the production of composite structural elements of facing members such as bricks, tiles or stones which after being positioned in a mold in their ultimate relationship, are joined together with cement or the like.

Prefabricated building models one or more stories high and of a considerable width or models in the form of perpendicular building elements or room cubes have been known for many years in the building industry and are being used more and more for industrial constructions.

As is known, building elements for outer walls must be of a durable construction but it is equally important that they have an attractive appearance and are preferably maintenance-free. For these reasons elements are often used which consist of a concrete slab faced with facing units of various types, such as ceramic tiles, facade bricks etc. Alternatively the elements may be composed only of facing units joined together by a binder. The completed building elements, flat angle elements or room cubes are often transported completely finished to the building site where, together with other construction parts, they are assembled to form wall surfaces or parts of a building.

This type of building element is usually manufactured in a horizontal mold. If the elements are to be provided with or are consisting of facing units, there are usually arranged during the manufacturing process with their facade side facing the bottom of the mold. The facing units are then positioned in their ultimate relationship and the required sealing to the facade surfaces is carried out in various ways.

The units may thereby be positioned between rigid or elastic strips attached in the bottom of the mold, or they may be applied on a layer of elastic material in the bottom of the mold with positioners or wedges in the same pattern as that obtained by the joints between the facing units.

According to another known method the facing units are arranged on an elastomeric blow-up layer arranged at the bottom of the mold. The facing units are placed on the layer and when they have been fixed in their position the layer is blown up. The parts of the layer situated between the facing units will thus push between the units and seal around the end surfaces of the facing units.

The facing units may be arranged in the desired pattern inside or outside the mold. In the latter case they may be grouped on a conveyor belt provided with the desired pattern. The group thus obtained is then lifted from the conveyor belt and placed in the mold by a mechanical jig or one operated under vacuum. In order to achieve the necessary seal against the edges of the facing units to protect the facade surfaces from being contaminated by the binder which will later be applied over the back of the units and run down between them to join them to form an element, a liquid, semi-liquid, soft or plastic material may be arranged at the bottom of the mold. This material may be of such a nature that it acquires these properties when heated and then solidifies when cooled or the material may be of such a type that it has this consistency before, during or after the immersion of the units into the material. The latter method, when the facing units are lowered into a plastic material has been found to give good results but it is necessary for the facing units to be positioned mechanically or manually on a continuous conveyor belt and then be lifted over to the mold by an expensive jig.

Irrespective of the method used to form the joints between the facing units, the finished building element is produced by pouring binder (mortar) into the joints formed. As mentioned, it is thus of great importance that no binder or part of the binder, for example cement water, can penetrate to the facade surfaces of the facing units and thus make them dirty. It is namely extremely difficult to carry out a later cleaning of the facade surfaces at reasonable costs. Therefore it is absolutely necessary to have clean facade surfaces and joints which are performed correctly both technically and esthetically if the building elements are to be successful and be accepted on the building sites.

The known methods for making joints, however, all have disadvantages of different types. With the methods in which elastic strips or the like are placed at the bottom of a mold it is difficult to prevent binder or cement water from running out over the facade surfaces. This is particularly so as the facing units often have certain variations in measurements which may cause a certain slant or unevenness. The units may also be slightly damaged, a corner being knocked off for example, so that strips fitted in the bottom of the mold cannot without relatively expensive treatment be made to satisfactorily seal around the facing units either. If on top of that the facing material has an irregular shape, for example a specific surface pattern, which means that strips or padding must be given the same shape, it may be be economically and practically extremely difficult to obtain such a seal that the facade surfaces are protected. Thus, when using previously known methods of this type it has either been necessary to take great care and a considerable amount of time for performing the joints or to cary out expensive cleaning treatment over the facade surfaces after joining. These drawbacks have of course counteracted the advantageous properties of building elements from other points of view as well as the financial advantages.

In such methods where the facing units are placed on an elastic blow-up layer it is admittedly easier to obtain a seal between the elastic layer and the facing units—even if they have an irregular pattern—but in general these methods have the disadvantage that a weight must be placed on the facing units or that they must be fixed in position in some other way before the layer is blown up. If this is not done the facing units will be lifted and disrupted from their horizontal position so that the pattern of the joints is spoiled. However, such means for fixing or holding the facing units in their ultimate relationship complicate any industrial manufacturing method for these building elements to a great extent and thus also limit the practical use of the building elements.

The arrangement of the facing units in a plastic material as described above has also shown good results, but in this case the units must be placed mechanically or manually on a conveyor belt and then lifted by an expensive jig into the mold.

The method and carrier members of the present invention overcome the above mentioned difficulties in a simple and economical manner.

It is accordingly an object of the present invention to provide an economical method and carrier member for producing composite building elements having a clean face and technically excellent bond.

Other objects and advantages of the invention will become obvious from the accompanying drawings together with the following detailed description. In the drawings.

Figure 1:
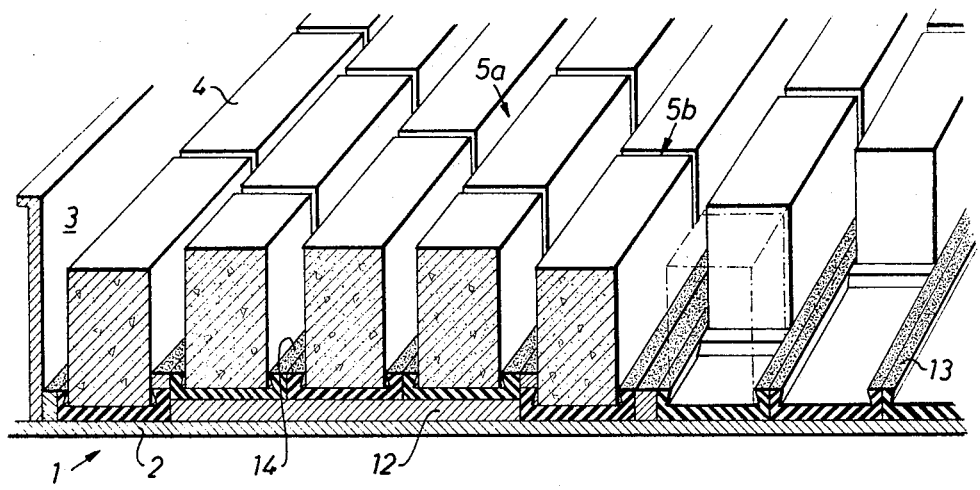
FIG. 1 is a view in perspective of a mold intended for the production of building elements. A number of frame-like carrier members have been arranged in the mold.

In the drawings a mold is designated 1. The mold comprises a bottom plate 2 and side walls 3 (only one side wall is shown). A number of facing units 4 have been positioned on the bottom 2 of the mold 1 in a predetermined pattern in order to obtain a specific building element. There are joints 5a, 5b around the units 4, both between adjacent rows of units and between each individual unit in a row. These joints 5a, 5b will later be filled with a binder material. The facing units 4 are arranged in a frame-like, strip-shaped carrier member 6 having a base part 7 and two side pieces 8, 9 projecting from the base part.

The carrier members 6 may suitably be made of an elastic yielding material such as rubber, plastic or the like, and each such carrier member containing a suitable number of bricks for the width of the mold is then arranged with its base part 7 on the bottom 2 of the mold 1. Thus the side flanges 8, 9 of adjacent carrier members 6 form the joint spaces 5a for binder between adjacent bricks 4 in carrier members 6 which are located next to each other.

The joint space 5b between adjacent units 4 within each carrier member 6 is achieved by arranging spacers 10 between adjacent bricks 4. The spacers 10 may be arranged manually or by machine between the units 4 at the same time as the units 4 are inserted in the carrier member. The spacers 10 are arranged substantially perpendicular to the longitudinal direction of the carrier member and are preferably approximately the same height as the side flanges 8, 9. In order to facilitate application of these spacers 10 the strip-shaped carrier member 6 may be provided with suitable markings.

The base part 7 of the carrier member 6 may be made in one piece with the side flanges 8, 9. If desired, the base part 7 may also have openings or perforations. Alternatively the base part 7 may be formed of stretchable strips arranged at a distance from each other between the side flanges 8, 9. The strips may be arranged to overlap each other in a crosswise pattern.

Figures 2, 3:
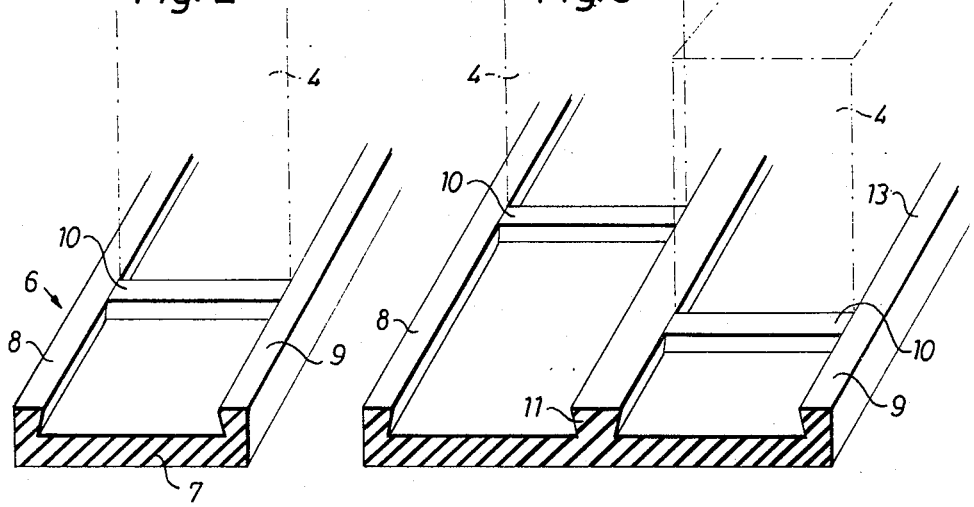
FIGS. 2 and 3 show two different embodiments of such carrier members.

Of course the carrier members 6—as shown in FIG. 3—may each comprise several rows of facing units 4 and have suitable central strips 11 in the base part 7.

In order to improve the seal between the facing units and the strips 8, 9 and 11, these are preferably slightly bevelled inwardly on their inner sides.

By arranging special mold sections 12—comprising inserts between the bottom 2 of the mold 1 and base parts 7 of the carrier members 6—as shown in FIG. 1, it is possible to acquire any desired recesses in the finished facade surface.

If necessary the upper surfaces 13 of the side pieces 8, 9 and 11 may be provided with a smoothing coating 14 in the form of a layer of sand or the like. This may also be done for decoration, that is if certain special effects are desired in the finished joint.

Figure 4:
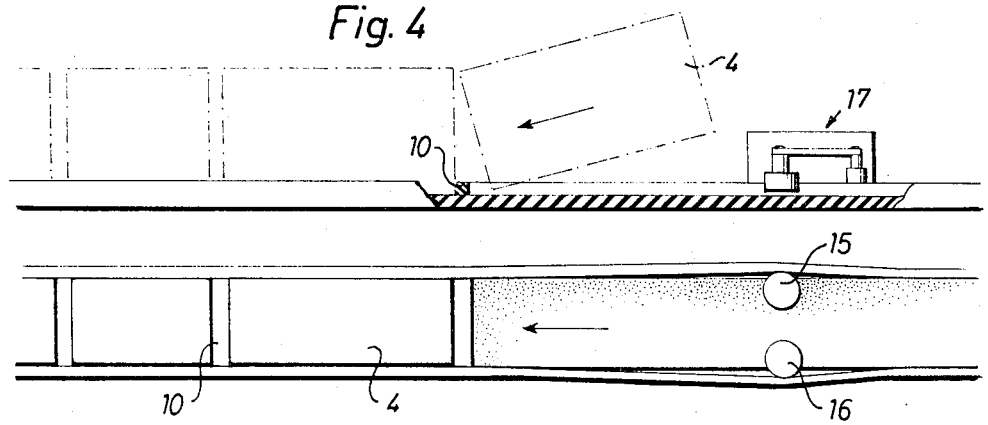
FIG. 4 shows a suitable means for positioning the building units in frame-like carrier members, the means being shown partly from the side and partly from above.

FIG. 4 shows a suitable means for the free application of the units in the carrier member 6. The carrier members are fed in the form of a continuous track past a stretching station 14 where the carrier members 6 are stretched slightly laterally by means of rollers 15, 16, for example, so that the units 4 can easily be inserted. At the same time spacers 10 may be applied between successive facing units 4.

As is clear from the above, the spacers 10 are inserted substantially perpendicular to the length of the carrier member in order to achieve the desired seal between the facing units and to form the desired joint. The spacers may suitably be made of elastomeric material, plastic or rubber, and normally have the same shape and height as the inner side of the carrier members although the width may vary. Although spacers of the same width are generally used, it is possible with the help of wider or narrower spacers to even out any discrepancies in the length, width or height of the facing units 4.

A carrier member produced in accordance with the invention which is, for example, 360 cm. long and holds twelve facing units, each 29 x 9 x 6.5 cm., weighs about 50 kg. including the carrier member. Such a carrier member can be moved with the help of a moving track or conveyor belt to the place when, together with other carrier members or mold sections, it is to form the element. The carrier members may also be transported to a store close to the filling station, where the carrier members are collected to form an element which is transported from the station by a truck, for example, to the point when the building element is manufactured. With the help of the truck the carrier members can be packed close together. The mold sections 12 described above may be the same length as the element, as shown in FIG. 1, but they may also be different lengths depending on where they are to be used. These may be used, for example, if it is desired to increase the width of the joint or alter the shape of the joint within the element or in order to finish a joint at the side of the mold. They may also be used if some part of the element is to be recessed from the surface of the element or to equalize the level differences in joints and also in order to widen joints and give them a certain shape.

Another alternative to that described above is to place the carrier members directly in the mold and then fill them with facing units. In this case the mold should preferably be able to be lifted and lowered and be placed in a slightly sloping position when being filled.

When the frame-like carrier members with the facing units and any mold sections have been arranged in the desired position in the mold, cement mortar or other binder is applied and this flows down between the facing units. If the carrier members are uneven at the edge or have been incorrectly placed, these defects may be reflected in the joints in the finished element. This can be alleviated by spreading a powdered equalizing material such as sand or crushed marble over the entire surface and then brushing it down into the joints before the binder is applied.

In this way any irregularities can be hidden and also a desired colour and surface structure may be obtained with the material which sticks in the mortar or binder.

Building elements manufactured in accordance with the invention thus have a mold bottom consisting entirely or partially of carrier members and mold sections which accompany the element when it is raised to vertical position. When the element has been erected, the carrier members and sections are removed to give the element its final form. In order to facilitate removal the carrier members may be provided with holes or other recesses, as mentioned above, which make them easier to grip.

The frame-like carrier members, mold sections, etc. mentioned above, are suitably made of a material which can be used several times. After use these parts are cleaned and then returned to the filling station for re-use.

It will be obvious to those skilled in the art that numerous modifications and changes may be made in the carrier member and method set forth without departing from the spirit and concept of the invention disclosed. For example the transverse joints 5b may be omitted. Furthermore the frame-like carrier member may also consist of a flat track without side pieces.

What I claim is:

1. A method of manufacturing composite structural elements of the type having a plurality of facing units joined together by a binder, comprising positioning a plurality of facing units in a carrier member having slightly elastic side edges projecting upwards, and at least partially surrounding the side edges of said units, arranging such filled carrier members in a predetermined pattern on the bottom of a mold in the same relative positions that the units will have in a finished structural element; casting a binder in the spaces defined by said side edge projections between adjacent carrier members and permitting the binder to set for joining the units together to form a composite element; removing the composite element from the mold and removing the carrier members to expose the face of the composite element.

2. The method of claim 1, including the step of applying a number of facing units one after the other in said carrier members and arranging spacers between adjacent facing units.

3. The method of claim 1, including the step of arranging said carrier members on the bottom of the mold on intermediate mold sections.

4. The method of claim 3, including the step of applying a thin layer of sand or the like on the joints in the mold before the binder is poured in.

5. The method of claim 1, including the step of temporarily parting the side edges of the carrier members to facilitate the insertion of the facing units.

References Cited

UNITED STATES PATENTS 3,629,384  12/1971  Elgenstierna ......... 264—261
3,640,046  2/1972  Anderson et al. ...... 264—261

ROBERT F. WHITE, Primary Examiner

T. E. BALHOFF, Assistant Examiner

U.S. Cl. X.R.

264—313